Jan. 23, 1962  G. P. KELLEY  3,017,646
DOCKBOARD
Filed May 14, 1958  2 Sheets-Sheet 1

INVENTOR.
Garrett P. Kelley
BY
John W. Michael
Attorney

Jan. 23, 1962
G. P. KELLEY
3,017,646
DOCKBOARD
Filed May 14, 1958
2 Sheets-Sheet 2
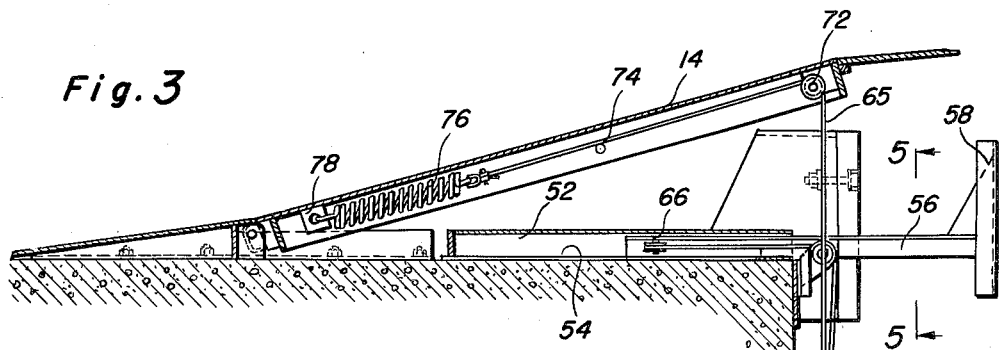
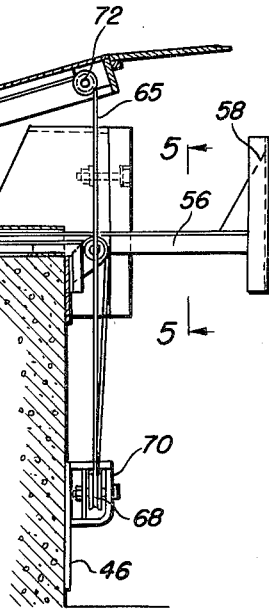
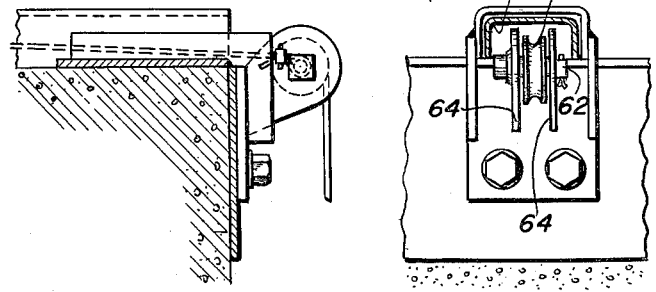
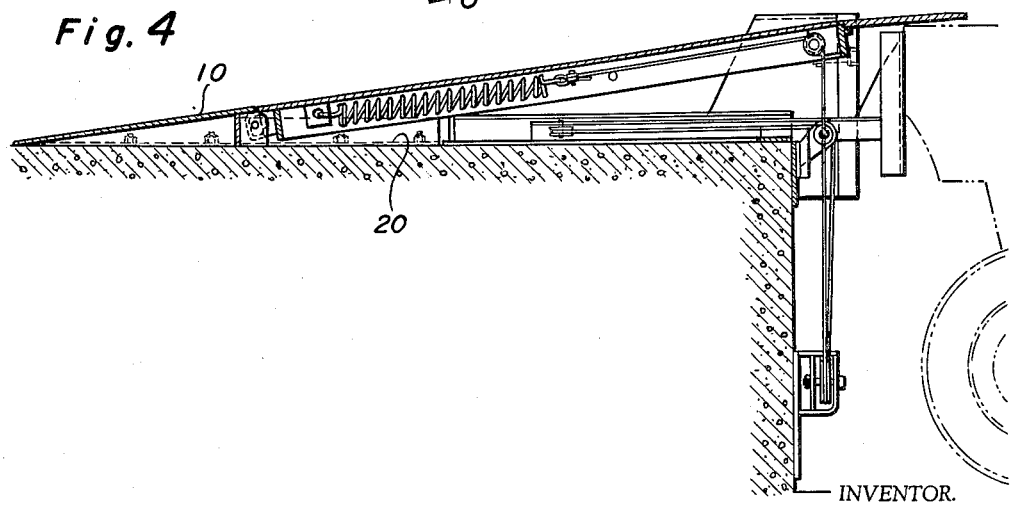
INVENTOR.
Garrett P. Kelley
BY
John W. Michael
Attorney United States Patent Office 3,017,646
Patented Jan. 23, 1962

3,017,646
DOCKBOARD
Garrett P. Kelley, 4973 N. Newhall St., Milwaukee, Wis.
Filed May 14, 1958, Ser. No. 735,334
2 Claims. (Cl. 14—71)

This invention relates to adjustable dockboards and particularly to an automatically adjusted dockboard which can be mounted directly on an existing loading platform.

The principal object of this invention is to reduce the cost of installing automatic dockboards on existing loading docks.

Another object is to provide an automatic dockboard which can be mounted directly on existing loading docks without extensive alteration to the dock.

Still another object of this invention is to provide an adjustable dockboard achieving the above objects and actuated by the truck backing towards the dock and having overtravel provision to accommodate motion of the truck beyond the point at which the board contacts the truck bed.

Other objects and advantages will be pointed out in, or be apparent from, the specification and claims, as will obvious modifications of the single embodiment shown in the drawings, in which:

FIGURE 3 is a section in line 3—3 in FIGURE 1 showing a truck bed backing towards the actuating arm with the spring 44 omitted;

FIGURE 4 is similar to FIGURE 3 but shows the board contacting the truck bed and the overtravel spring elongated;

FIGURE 5 is a detail view from line 5—5 in FIGURE 3; and

FIGURE 6 is a detail from line 6—6 in FIGURE 5.

In the broader aspects the present invention is an improvement upon the dockboard shown in Kelley Patent No. 2,751,615. That dockboard, however, required considerable work upon existing loading docks to accommodate the dockboard assembly which had a plurality of counterweights located underneath the dockboard and in a recess in the loading dock. This arrangement is quite satisfactory where the loading dock is being fabricated with that dockboard in mind. However, on existing loading docks the installation becomes rather costly and, with that in mind, the present dockboard has been designed to permit installation fully on the exterior of an existing loading dock. As will be apparent as this description proceeds the present structure is applicable to any loading dock. The prior Kelley construction had a counterweight located underneath the dockboard and in a recess in the loading dock for the purpose of biasing the dockboard to an elevated position. The present structure has torsion springs mounted on the front of the loading dock to bias the dockboard to an elevated position. In the prior Kelley construction an arm projected from the loading dock and was mounted for reciprocation so that upon being pushed into the loading dock by a truck backing towards the loading dock the motion thereof was transmitted to the board to lower the board onto the bed of the actuating truck. In the broad sense, the same feature is found in the present arrangement except that the present reciprocating arm is mounted wholly on the surface of the loading dock. Both the prior and the present constructions will accommodate overtravel of the reciprocating arm; that is, if the truck continues to back into the loading dock after the board has contacted the bed of the truck, provision is made for this overtravel without damage to any of the parts. As a matter of fact, this overtravel is beneficial in that it loads the board to follow motion of the bed of the truck as the truck is loaded or unloaded and consequently the springs of the truck are compressed or relieved.

Figure 1:
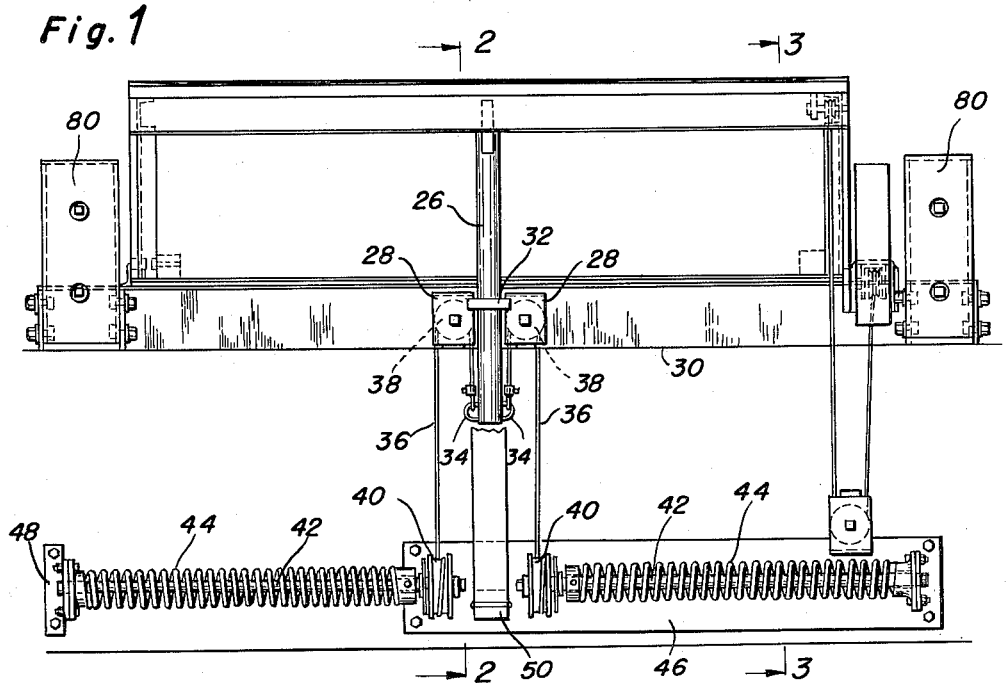
FIGURE 1 is a front elevation of the present dockboard.
Figure 2:
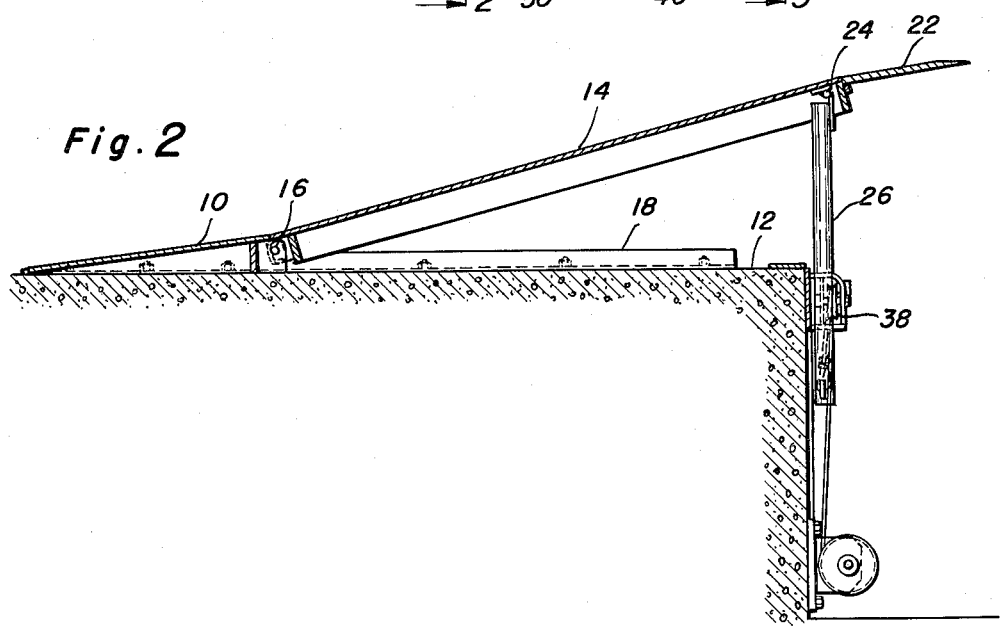
FIGURE 2 is a vertical section taken on line 2—2 in FIGURE 1.

Referring now to the drawings in detail, reference to FIGURES 1 and 2 will show that a short fixed ramp 10 is secured to the top surface 12 of the loading dock and carries hinge plates to which the dockboard 14 is connected by hinge pins 16. The ramp section 10 includes forwardly projecting center brace 18 which is fixed to the top of the loading dock and also includes the short lateral forwardly projecting braces 20 similarly fixed to the top of the dock so as to rigidly fix the ramp to the top of the loading dock. The dockboard has a projecting lip portion 22 which is adapted to contact the bed of the truck. Spaced rearwardly of the front edge of the lip is a hinge 24 by which the downwardly projecting strut or column 26 is connected to the dockboard. The strut 26 hangs down between the two sheave brackets 28, 28 mounted on plate 30 fixed on the top front edge of the loading dock. The sheave plates or brackets 28, 28 are provided with a strap 32 which spans the space between the brackets and prevents outward movement of column 26. The lower end of column 26 is provided with anchor eyelets 34, 34 to which cables 36, 36 are connected. These cables pass up over sheaves 38, 38 and are wound on and anchored to drums 40, 40 fixed on the torsion spring shaft 42, 42 so that cable will be pulled from the drums as the column is moved downwardly. As the cable is pulled from the drum torsion springs 44, 44 are wound up to increase the force biasing the column and, hence, the dockboard to an elevated position. It will be noted that the two drums and the entire righthand torsion spring assembly are mounted on a single plate 46 fixed to the lower face or front of the loading dock. The left end of the left hand (FIGURE 1) torsion spring is provided with a small mounting bracket 48 fixed to the front of the dock. The large mounting plate 46 also serves as a mounting point for the lower end of wear plate 50 which extends from the top plate 30 to the bottom plate 46 behind the column to prevent wear of the column against the front surface of the loading dock (if there is such a surface).

Mounted on the top of the loading dock to the right (FIGURES 1 and 3) of the dockboard is an inverted channel housing 52 mounted on a plate 54 secured to the top of the loading dock. The channel and plate form a guide for operating arm 56 having a bumper 58 at its outermost end. The operating arm 56 itself has an inverted channel section (as may be seen in FIGURE 5) and straddles sheave 60 carried on pin 62 between mounting brackets 64, 64. Wire rope or cable 65 is secured to the right end of pin 62 (see FIGURE 5) and runs back around sheave 66 at the rear end of the operating arm and is then reeved over pulley 60 to run down to the sheave 68 mounted on bracket 70 on the lower mounting panel 46. The rope then runs up over sheave 72 on the underside of the dockboard 14 and runs back over a guide pin 74. The end of the rope is connected to spring 76 which is anchored to bracket 78 on the underside of the dockboard. It will be appreciated that with the torsion springs 44, 44 biasing the ramp or dockboard to the raised position, the force will also act through the wire rope to extend the operating arm 56 to its projected position. As the truck backs into the loading dock, the truck bed strikes the operating arm bumper 58 and moves the arm rearwardly. This motion has a motion multiplying effect so that the dockboard is pulled down two inches for every inch the arm is moved back. Spring 76 exerts a greater force than the torsion springs 44, 44 and, hence, does not elongate while the dockboard is being moved down. When the lip of the dockboard rests on the bed of a truck, any further rearward movement of the operating arm as the truck continues backing into the loading dock will act to elongate spring 76 and, thus, accomplish two purposes: (1) overtravel is accommodated and, hence, the mechanism cannot be damaged by the truck backing too far into the loading dock and (2) the biasing force is imposed upon the dockboard holding it on the truck bed so that it will follow motions of the truck bed as the load on the truck is increased or decreased.

While not important from an operational standpoint, it will be noted that on each side of the dockboard there is a stationary bumper 80, 80 which serves to prevent rearward movement of the truck beyond the point at which the operating mechanism and pulleys are safe from injury. The face of the stationary bumpers then constitutes the rearmost plane into which the bumper 58 on the operating arm 56 can be moved.

The drawings show the dockboard assembly mounted on a loading dock of the type having a concrete top and front wall. It will be appreciated that the present structure is readily adapted to mounting on such loading docks as have an opening under the loading dock with the front edge of the loading dock supported by spaced columns. The torsion spring could be mounted on any vertical support or could be mounted in the opening under the board. The important feature here is that there is no need to cut out the top or front surface of an existing dockboard. All of the operating mechanism mounts on the exterior of the loading dock.

Although but one embodiment of the present invention has been illustrated and described, it will be apparent to those skilled in the art that various changes and modifications may be made therein without departing from the spirit of the invention or from the scope of the appended claims.

I claim:

1. An automatically adjustable dockboard adapted for installation upon an existing dock comprising: a stationary ramp securable to the top of an existing dock; a movable ramp having front and rear edges and a flat deck secured to and covering a frame structure; means hingedly connecting the ramps so that upon securement of the stationary ramp to the top of a dock the movable ramp may be swung from a lowered position with its frame structure resting upon the dock and its deck substantially flush with the top of the stationary ramp to a raised position at which its front edge is at an elevation above that of the bed of any carrier that may be brought into loading or unloading position in front of the dockboard, the front edge portion of the movable ramp projecting beyond the edge of the dock when the stationary ramp is properly located on the dock so as to come down upon and rest on the bed of a carrier in position in front of the dockboard as the movable ramp is lowered; biasing means to react between the dock and the movable ramp to bias the movable dock to its raised position; a ramp lowering arm; means securable to the top of the dock to mount the arm for movement to and from a position projecting beyond the edge of the dock and into the path of a carrier being backed into position; cable anchoring means adapted to be fixed to the dock near the edge thereof; a pulley on the arm; a pulley adapted to be mounted at the edge of the dock adjacent to the projecting end of the arm; a pulley at the underside of the movable ramp near its front edge; a pulley adapted to be mounted on the dock below said second named pulley; a cable having one end secured to said cable anchoring means, reeved about said pulleys and having its other end portion extending from the pulley which is at the underside of the movable ramp towards the hinge connection between the ramps; and a spring mounted within the frame structure of the movable ramp beneath the deck thereof and connected between one of the ramps and the adjacent end of the cable to hold the cable taut and enable lowering of the movable ramp by inward movement of the arm in consequence of a carrier engaging the same and moving toward the dock, said spring yielding in the event of continued inward movement of the arm after descent of the movable ramp is arrested as by its front edge portion coming to rest upon the bed of the carrier.

2. An automatically adjustable dockboard installation comprising: a loading dock having a horizontal top and an upright front face; a dockboard having a flat deck covering and secured to a frame structure, said dockboard having front and rear edges; means fixed to the top of the loading dock and having the rear edge of the dockboard hinged thereto so that the dockboard may be swung from a lowered position resting flat upon the top of the dock to an elevated position at which its front edge is higher than the level of the bed of any carrier that may be moved into loading or unloading position in front of the dock, the hinge axis being so located with respect to the edge of the dock that the front edge portion of the dockboard projects therebeyond to rest upon the bed of a carrier in loading and unloading position as the dockboard is lowered; biasing means reacting between the dock and the dockboard to yieldingly urge the dockboard to its elevated position; a dockboard lowering arm; means slidably mounting said arm on the top of the dock alongside the dockboard with the arm projecting from the front of the dock to be engageable by a carrier as the same is moved into loading or unloading position in front of the dockboard; a pulley at the underside of the dockboard near its front edge; a second pulley mounted on the front face of the dock a substantial distance below the top of the dock and substantially in line with the first pulley; a third pulley mounted on the front edge portion of the dock adjacent to said arm; a fourth pulley on the inner portion of the arm; a cable having one end anchored to the dock near its front edge and passing successively around the fourth pulley, the third pulley, the second pulley and the first pulley, and extending from the first pulley along the underside of the dockboard toward its hinged mounting; and a spring connected between the dockboard and the adjacent end of the cable maintaining the cable taut, the length of the cable being such that as long as the biasing means acting upon the dockboard holds the same in elevated position, said arm is in its projected position to be engaged by a carrier and moved inwardly by the carrier as the same is backed into position to thereby lower the dockboard, said spring accommodating overtravel of the arm caused by inward movement thereof after descent of the dockboard is arrested by its front edge portion coming to rest upon the bed of the carrier.

References Cited in the file of this patent

UNITED STATES PATENTS

| 2,257,484 | Rowe | Sept. 30, 1941 |
| 2,338,205 | Rowe | Jan. 4, 1944 |
| 2,751,615 | Kelley | June 26, 1956 |

FOREIGN PATENTS

| 26,868 | Finland | Oct. 30, 1954 |
| 726,124 | Great Britain | Mar. 16, 1955 |